United States Patent [19]
Loper et al.

[11] Patent Number: 5,611,063
[45] Date of Patent: Mar. 11, 1997

[54] METHOD FOR EXECUTING SPECULATIVE LOAD INSTRUCTIONS IN HIGH-PERFORMANCE PROCESSORS

[75] Inventors: Albert J. Loper, Cedar Park; Soummya Mallick; Michael Putrino, both of Austin, all of Tex.

[73] Assignee: International Business Machines Corporation, Armonk, N.Y.

[21] Appl. No.: 597,647

[22] Filed: Feb. 6, 1996

[51] Int. Cl.$^6$ ............................................. G06F 9/30
[52] U.S. Cl. ...................... 395/381; 395/800; 395/383
[58] Field of Search .................. 395/375, 700, 395/800

[56] References Cited

U.S. PATENT DOCUMENTS

| | | | |
|---|---|---|---|
| 5,377,336 | 12/1994 | Eickemeyer et al. | 395/375 |
| 5,420,990 | 5/1995 | McKeen et al. | 395/375 |
| 5,421,022 | 5/1995 | McKeen et al. | 395/800 |
| 5,428,807 | 6/1995 | McKeen et al. | 395/800 |
| 5,454,117 | 9/1995 | Puziol et al. | 395/800 |
| 5,526,499 | 6/1996 | Bernstein et al. | 395/375 |
| 5,542,075 | 7/1996 | Ebcioglu et al. | 395/700 |

*Primary Examiner*—Robert B. Harrell
*Assistant Examiner*—Saleh Najjar
*Attorney, Agent, or Firm*—Michael A. Davis, Jr.; Andrew J. Dillon

[57] ABSTRACT

A method for selectively executing speculative load instructions in a high-performance processor is disclosed. In accordance with the present disclosure, when a speculative load instruction for which the data is not stored in a data cache is encountered, a bit within an enable speculative load table which is associated with that particular speculative load instruction is read in order to determine a state of the bit. If the associated bit is in a first state, data for the speculative load instruction is requested from a system bus and further execution of the speculative load instruction is then suspended to wait for control signals from a branch processing unit. If the associated bit is in a second state, the execution of the speculative load instruction is immediately suspended to wait for control signals from the branch processing unit. If the speculative load instruction is executed in response to the control signals, then the associated bit in the enable speculative load table will be set to the first state. However, if the speculative load instruction is not executed in response to the control signals, then the associated bit in the enable speculative load table is set to the second state. In this manner, the displacement of useful data in the data cache due to wrongful execution of the speculative load instruction is avoided.

11 Claims, 3 Drawing Sheets

5,611,063

METHOD FOR EXECUTING SPECULATIVE LOAD INSTRUCTIONS IN HIGH-PERFORMANCE PROCESSORS

BACKGROUND

1. Technical Field

The present disclosure relates to a method for improving data processing in general and, in particular, to a method for executing speculative instructions within a processor. Still more particularly, the present disclosure relates to a method for selectively executing speculative load instructions within a high-performance processor such that wrongful displacement of useful data in a data cache can be avoided.

2. Description of the Related Art

A high-performance processor achieves high instruction throughput by fetching and dispatching instructions under the assumption that branches are correctly predicted and allows instructions to execute without waiting for the completion of previous instructions. This is commonly known as speculative execution. Typically, the processor executes instructions speculatively when it has resources that would otherwise be idle, so that the operation may be done at minimum or no cost. If subsequent events indicate that the speculative instruction should not have been executed, the processor simply abandons any result that the speculative instruction produced.

Most operations can be performed speculatively, as long as the processor appears to follow a simple sequential method such as those in a scalar processor. For some applications, however, speculative operations can be a severe detriment to the performance of the processor. For example, in the case of executing a load instruction after a branch instruction (or known as speculative load because the load instruction is executed speculatively without knowing exactly which path of the branch would be taken), if the predicted execution path is incorrect, there is a high delay penalty associated with the pending speculative load in the instruction stream, requesting the required data from the system bus. In many applications, the rate of mispredicted branches is high enough that the cost of speculatively accessing the system bus is prohibitively expensive. Furthermore, essential data stored in a data cache may be displaced by some irrelevant data obtained from the system bus because of a wrongful execution of a speculative load instruction caused by misprediction.

Consequently, it would be desirable to provide a method for selectively executing speculative load instructions in a high-performance processor by utilizing a better prediction scheme.

SUMMARY

It is therefore an object of the present disclosure to provide an improved method for data processing.

It is another object of the present disclosure to provide an improved method for executing speculative instructions within a processor.

It is yet another object of the present disclosure to provide an improved method for executing speculative load instructions within a high-performance processor such that wrongful displacement of useful data in a data cache can be avoided.

A method and processor for selectively executing speculative load instructions are disclosed. The processor has a multiple number of buffers for storing instructions and various execution units for executing instructions. In accordance with the present disclosure, when a speculative load instruction for which the data is not stored in a data cache is encountered, a bit within an enable speculative load table which is associated with that particular speculative load instruction is read in order to determine a state of the bit. If the associated bit is in a first state, data for the speculative load instruction is requested from a system bus and further execution of the speculative load instruction is then suspended to wait for control signals from a branch processing unit. If the associated bit is in a second state, the execution of the speculative load instruction is immediately suspended to wait for control signals from the branch processing unit. If the speculative load instruction is executed based on the control signals from the branch processing unit, the associated bit in the enable speculative load table will be thereafter set to the first state. However, if the speculative load instruction is not executed in response to the control signals from the branch processing unit, the associated bit in the enable speculative load table is thereafter set to the second state. In this manner, the displacement of useful data in the data cache due to wrongful execution of the speculative load instruction is avoided.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative disclosure when read in conjunction with the accompanying drawings, wherein.

DETAILED DESCRIPTION OF AN ILLUSTRATIVE EMBODIMENT

The present disclosure may be implemented on a variety of processors having a pipelined architecture. For the purpose of illustration, an illustrative embodiment as described below is implemented on one of the PowerPC™ line of microprocessors manufactured by International Business Machines Corporation, which operates according to reduced instruction set computing (RISC) techniques.

Figure 1:
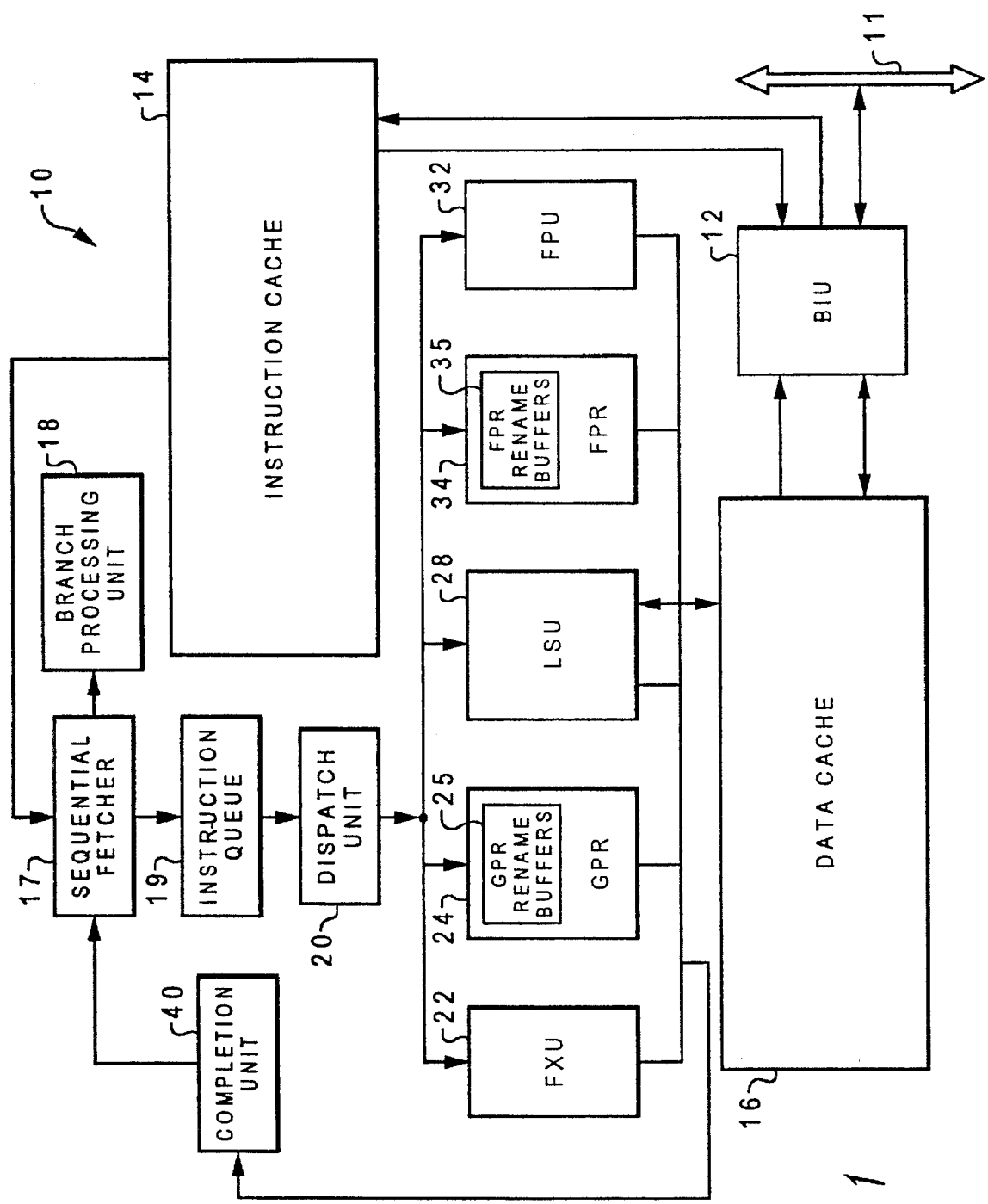
FIG. 1 is a block diagram of an illustrative embodiment of a processor which utilizes the method of the present disclosure.

Referring now to the drawings and in particular to FIG. 1, there is illustrated a block diagram of a processor 10 for data processing. In an illustrative embodiment of the disclosure, processor 10 is a single integrated circuit superscalar microprocessor, comprising various registers, buffers, execution units, and functional units. As depicted in FIG. 1, processor 10 is coupled to system bus 11 via a bus interface unit (BIU) 12 within processor 10. BIU 12 controls the transfer of information between processor 10 and other devices, such as a main memory (not shown), that are coupled to system bus 11. Processor 10, system bus 11, and the other devices coupled to system bus 11 together form a host data processing system.

Within processor 10, BIU 12 is connected to instruction cache 14 and data cache 16. Both instruction cache 14 and data cache 16 are high-speed caches which enable processor 10 to achieve a relatively fast access time to a subset of instructions or data previously transferred from main memory to caches 14 and 16, thus improving the speed of operation of the host data processing system. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the execution circuitry of processor 10 includes three execution units, namely, fixed-point unit (FXU) 22, load/store unit (LSU) 28, and floating-point unit (FPU) 32. It is well known to those skilled in the computer arts that each of the three execution units can execute one or more classes of instructions, and all execution units operate concurrently during each processor cycle. For example, FXU 22 performs fixed-point mathematical operations such as addition, subtraction, ANDing, ORing, and XORing, utilizing source operands received from specified general purpose registers (GPRs) 24 or GPR rename buffers 25. Following the execution of a fixed-point instruction, FXU 22 outputs the data results of the instruction to GPR rename buffers 25 which provide temporary storage for the data results until the instruction is completed before transferring the data results from GPR rename buffers 25 to at least one of the GPRs 24. Conversely, FPU 32 performs floating-point operations, such as floating-point multiplication and division, on source operands received from floating-point registers (FPRs) 34 or FPR rename buffers 35. FPU 32 outputs data resulting from the execution of floating-point instructions to selected FPR rename buffers 35 which temporarily store the data results until the instructions are completed before transferring the data results from FPR rename buffers 35 to selected FPRs 34. As its name implies, LSU 28 executes floating-point and fixed-point instructions which either load data from memory (i.e., either data cache 16 or main memory) into selected GPRs 24 or FPRs 34 or which store data from a selected one of GPRs 24, GPR rename buffers 25, FPRs 34, or FPR rename buffers 35 to memory.

Processor 10 employs both pipelining and out-of-order execution of instructions to further improve the performance of its superscalar architecture. Accordingly, instructions can be executed by FXU 22, LSU 28, and FPU 32 in any order as long as data dependencies are observed. In addition, instructions are processed by each of FXU 22, LSU 28, and FPU 32 at a sequence of pipeline stages. Similar to any high-performance processor, processor 10 processes each instruction in five distinct pipeline stages—fetch, decode/ dispatch, execute, finish and completion/writeback, though some pipeline stages can be reduced or combined in certain design implementations.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. In contrast, sequential fetcher 17 removes branch instructions from the instruction stream and forwards them to BPU 18 for execution. BPU 18 includes a branch prediction mechanism, which in an illustrative embodiment comprises a dynamic prediction mechanism such as a branch history table, that enables BPU 18 to speculatively execute unresolved conditional branch instructions by predicting whether or not the branch will be taken.

During the decode/dispatch stage, dispatch unit 20 decodes and dispatches one or more instructions from instruction queue 19 to one of the appropriate execution units 22, 28, and 32. Also, during the decode/dispatch stage, dispatch unit 20 allocates a rename buffer within GPR rename buffers 25 or FPR rename buffers 35 for the data result of each dispatched instruction.

During the execute stage, execution units 22, 28, and 32 execute instructions received from dispatch unit 20 opportunistically as operands and execution resources for the indicated operations are available. Each of the execution units 22, 28, and 32 are equipped with a reservation table that stores dispatched instructions for which operands or execution resources are unavailable.

After execution has terminated, execution units 22, 28, and 32 store data results within either GPR rename buffers 25 or FPR rename buffers 35, depending upon the instruction type. Then, execution units 22, 28, and 32 signal completion unit 40 that the execution unit has finished an instruction. Finally, instructions are completed in program order by transferring result data from GPR rename buffers 25 or FPR rename buffers 35 to GPRs 24 or FPRs 34, respectively.

Figure 2B:
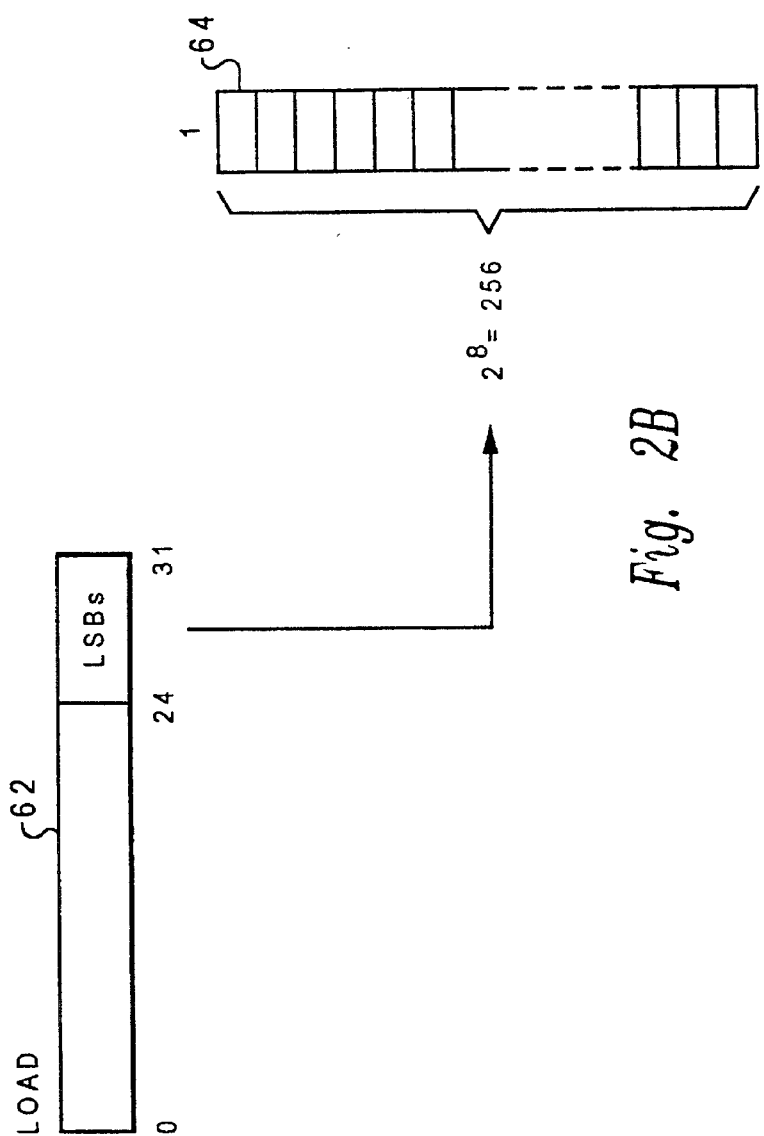
FIG. 2B is a block diagram illustrating an indexing scheme for a 32-bit load instruction to a 1×256 enable speculative load table, according to an illustrative embodiment of the disclosure.
Figure 2A:
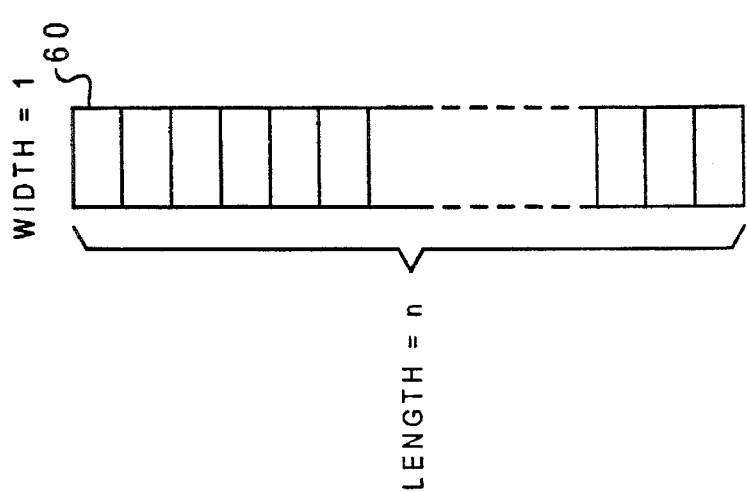
FIG. 2A is a block diagram of an enable speculative load table according to an illustrative embodiment of the present disclosure.

With reference now to FIG. 2A, there is depicted a block diagram of an Enable Speculative Load (ESL) table for facilitating the selective execution of speculative load instructions, according to an illustrative embodiment of the disclosure. ESL table 60 is a small memory location, preferably within processor 10, indexed by a lower portion of a load instruction address. As shown in FIG. 2A, ESL table 60 is 1 bit wide and n bit long, where n is the number of the least significant bits (LSBs) of a load instruction utilized for indexing. As an illustrative embodiment of the disclosure, the number of the LSBs of a load instruction, n, utilized for indexing to the ESL table is 8; however, n may be any integer that is deemed appropriate for a specific design. As shown in FIG. 2B, the last eight bits—24 to 31—of a 32-bit load instruction 62 may be utilized for indexing according to the purpose of the present disclosure. Because there are 256 permutations for eight bits (i.e., $2^8=256$), the length of ESL table 64 is also 256.

The indexing scheme under an illustrative embodiment is quite straight-forward: the numerical decimal value of the LSBs of a load instruction points to the bit position within an ESL table. For example, when the eight LSBs of load instruction 62 is "0000 0000," load instruction 62 points to the zeroth bit of ESL table 64; when the eight LSBs of load instruction 62 is "0000 0001," load instruction 62 points to the first bit of ESL table 64; when the eight LSBs of load instruction 62 is "0000 0010," load instruction 62 points to the second bit of ESL table 64; et cetera.

Each bit of ESL table 64 indicates whether a load instruction 62, having the corresponding indexing LSBs, has previously been executed after a branch instruction or not. As an illustrative embodiment of the disclosure, a "0" bit denotes "not executed" while a "1" bit denotes "executed," though a reverse assignment is also acceptable. When processor 10 is first initialized, all the bits within ESL table 64 should be zero. As time progresses and different load instructions after branch instruction are taken, some bits within ESL table 64 will be modified accordingly, as described in the following.

Figure 3:
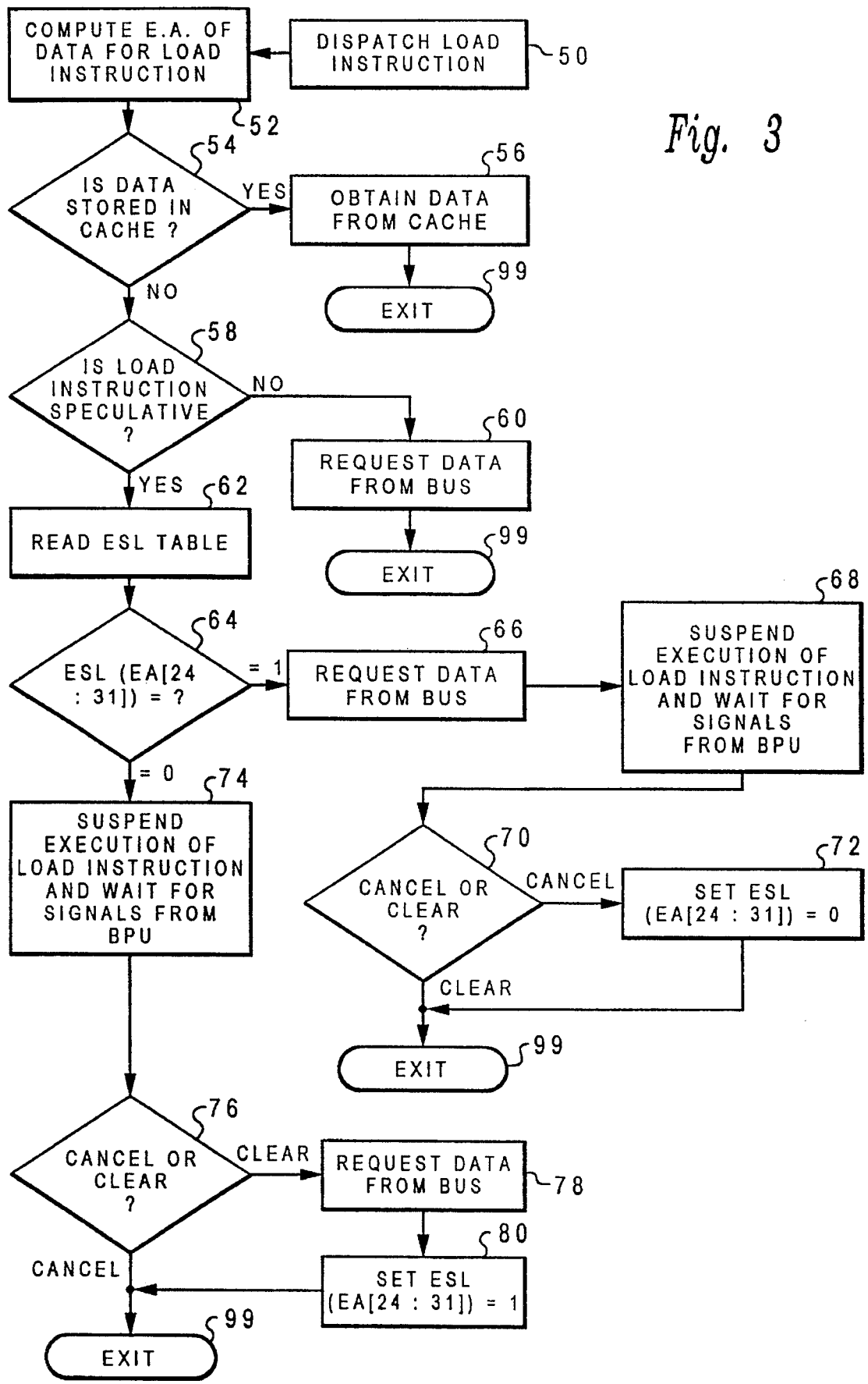
FIG. 3 is a high-level logic flow diagram of a method for selectively executing speculative load instructions according to an illustrative embodiment of the disclosure.

Referring now to FIG. 3, there is illustrated a high-level logic flow diagram of a method for executing speculative load instructions according to an illustrative embodiment of the disclosure. Starting at block 50, a load instruction is dispatched from dispatch unit 20. The effective address of the data for the load instruction is computed at block 52. Based on the computed effective address, a determination is then made at block 54 as to whether the data for the load instruction is currently stored in data cache 16 or not. If the data is currently stored in data cache 16, the data is then obtained from data cache 16 at block 56, and the process exits at block 99 such that the load instruction can be executed regardless of whether the load instruction is speculative or not. This is because even if it is a speculative load instruction, there is no penalty for mispredicted execution.

However, if the data is not currently stored in data cache 16, another determination must be made, at block 58, as to whether the load instruction is speculative or not. If the load instruction is not speculative, the process has no other option but to request the required data from system bus 11 at block 60, and then exits at block 99. Otherwise, if the load instruction is speculative, then the process reads the ESL table at block 62. A determination is subsequently made, at block 64, as to whether the required data should be obtained from system bus 11 or not. Such determination is performed by reading a bit within the ESL table at the corresponding position associated with the speculative load instruction according to the indexing scheme mentioned above, in order to determine a state of the bit. As an example shown at block 64, the last eight LSBs (i.e., EA[24:31]) of the 32-bit load instruction are utilized for indexing.

If the associated bit within the ESL table indexed by the speculative load instruction is in a first state, then the data is requested from system bus 11 at block 66. As an illustrative embodiment of the disclosure, the first state is a logical "1." Subsequently, at block 68, the execution of the speculative load instruction is suspended to wait for some control signals from branch processing unit (BPU) 18 in order to determine whether the execution of the speculative load instruction should proceed or not. The result of such determination is obtained at block 70 from BPU 18. If the indication based on the control signals from BPU 18 is to cancel the execution of the load instruction (note that at this point the load instruction is not speculative anymore), then the associated bit within the ESL table is updated according to an illustrative embodiment of the disclosure, at block 72, by reversing the associated bit from "1" to a "0," and the process exits at block 99. Otherwise, if the indication based on the control signals from BPU 18 is to clear the execution of the load instruction, then the process simply exits at block 99.

If the associated bit within the ESL table indexed by the speculative load instruction is in a second state, then, at block 74, the execution of the speculative instruction is immediately suspended to wait for the control signals from BPU 18 in order to determine whether the execution of the speculative load instruction should proceed or not. As an illustrative embodiment of the disclosure, the second state is a logical "0." The result of such determination is obtained at block 76 from BPU 18. If the indication based on the control signals from BPU 18 is to clear the execution of the load instruction (again, at this point the load instruction is not speculative anymore), then the required data is requested from system bus 11 at block 78. Subsequently, the associated bit within the ESL table is updated according to an illustrative embodiment of the disclosure, at block 72, by reversing the associated bit from "0" to a "1," and the process exits at block 99. Otherwise, if the indication based on the control signals from BPU 18 is to cancel the execution of the load instruction, again the process simply exits at block 99.

At this point, one who is skilled in the art of processor design may suspect that there can be quite a few load instructions having the same LSBs within even a single software program, and would wonder whether the speculative load instruction having the matched LSBs within the ESL table is exactly the same load instruction previously indexed. To put it another way, the bit in the ESL table may have been indexed by another load instruction having the same LSBs. However, this is not a major concern because such erroneous occurrence, probably quite rare, is considered as acceptable for the purpose of this disclosure. If the wrongful execution of the speculative load instruction due to mis-indexing starts to affect the performance of the processor, the resolution of the ESL table may be enhanced by increasing the number of LSBs utilized for indexing.

As has been described, the present disclosure provides a method for selectively executing speculative load instructions within a high-performance processor. By the utilization of an ESL table, this disclosure provides a unique method to decide whether a data request should be made to the system bus for the execution of a speculative load instruction when the data for the speculative load instruction cannot be found in the data cache.

While the disclosure has been particularly shown and described with reference to an illustrative embodiment, it will be understood by those skilled in the art that various changes in form and detail may be made therein without departing from the spirit and scope of the disclosure.

What is claimed is:

1. A method for selectively executing speculative load instructions within a processor, said method comprising the steps of:

reading a bit, in an enable speculative load table, associated with a speculative load instruction to determine a state thereof, in response to an encountering of said speculative load instruction, wherein data for said speculative load instruction is not stored in a data cache;

in response to a determination that said associated bit is in a first state, requesting said data for said speculative load instruction utilizing a system bus and suspending execution of said speculative load instruction pending control signals from a branch processing unit;

in response to a determination that said associated bit is in a second state, suspending execution of said speculative load instruction pending said control signals from said branch processing unit;

setting said associated bit in said enable speculative load table to said first state in response to an execution of said speculative load instruction based on said control signals;

setting said associated bit in said enable speculative load table to said second state in response to a non-execution of said speculative load instruction based on said control signals, wherein the possibility of displacing useful data in said data cache due to wrongful execution of said speculative load instruction is avoided.

2. The method for selectively executing speculative load instructions within a processor according to claim 1, wherein said method further comprises the step of setting all bits in said enable speculative load table to said second state during an initialization of said processor.

3. The method for selectively executing speculative load instructions within a processor according to claim 1, wherein said response to a determination that said associated bit is in a first state further comprises response to a determination that said associated bit is a logical "1," and wherein said response to a determination that said associated bit is in a second state further comprises response to a determination that said associated bit is a logical "0."

4. A processor for selectively executing speculative load instructions, said processor comprising:

means for reading a bit, in an enable speculative load table, associated with a speculative load instruction to determine a state thereof, in response to an encountering of said speculative load instruction and data for said speculative load instruction is not stored in a data cache;

means for requesting said data for said speculative load instruction utilizing a system bus and suspending execution of said speculative load instruction pending control signals from a branch processing unit, in response to a determination that said associated bit is in a first state;

means for suspending execution of said speculative load instruction pending said control signals from said branch processing unit, in response to a determination that said associated bit is in a second state;

means for setting said associated bit in said enable speculative load table to said first state in response to an execution of said speculative load instruction based on said control signals;

means for setting said associated bit in said enable speculative load table to said second state in response to a non-execution of said speculative load instruction based on said control signals, wherein the possibility of displacing useful data in said data cache due to wrongful execution of said speculative load instruction is avoided.

5. The processor for selectively executing speculative load instructions according to claim 4, wherein said processor further comprises means for setting all bits in said enable speculative load table to said second state during an initialization of said processor.

6. The processor for selectively executing speculative load instructions according to claim 4, wherein said first state is a logical "1" and said second state a logical "0."

7. The processor for selectively executing speculative load instructions according to claim 4, wherein said enable speculative load table is one bit wide and is indexed by a plurality of least significant bits of said speculative load instruction's address.

8. A data processing system for selectively executing speculative load instructions, said data processing system comprising:

a memory;

a processor, including:

means for reading a bit, in an enable speculative load table, associated with a speculative load instruction to determine a state thereof, in response to an encountering of said speculative load instruction and data for said speculative load instruction is not stored in a data cache;

means for requesting said data for said speculative load instruction utilizing a system bus and suspending execution of said speculative load instruction pending control signals from a branch processing unit, in response to a determination that said associated bit is in a first state;

means for suspending execution of said speculative load instruction pending said control signals from said branch processing unit, in response to a determination that said associated bit is in a second state;

means for setting said associated bit in said enable speculative load table to said first state in response to an execution of said speculative load instruction based on said control signals;

means for setting said associated bit in said enable speculative load table to said second state in response to a non-execution of said speculative load instruction based of said control signals, wherein the possibility of displacing useful data in said data cache due to wrongful execution of said speculative load instruction is avoided.

9. The data processing system for selectively executing speculative load instructions according to claim 8, wherein said data processing system further comprises means for setting all bits in said enable speculative load table to said second state during an initialization of said processor.

10. The data processing system for selectively executing speculative load instructions according to claim 8, wherein said first state is a logical "1" and said second state a logical "0."

11. The data processing system for selectively executing speculative load instructions according to claim 8, wherein said enable speculative load table is one bit wide and is indexed by a plurality of least significant bits of said speculative load instruction's address.

* * * * *